United States Patent [19]

Schutten et al.

[11] Patent Number: 4,706,175

[45] Date of Patent: Nov. 10, 1987

[54] SINGLE PHASE TO POLYPHASE BRIDGE-TYPE FREQUENCY MULTIPLIER

[75] Inventors: Herman P. Schutten; Robert W. Sackett, both of Milwaukee; Jan K. Sedivy, Elm Grove; Michael E. Taken, Cedarburg, all of Wis.

[73] Assignee: Eaton Corporation, Cleveland, Ohio

[21] Appl. No.: 402,864

[22] Filed: Jul. 29, 1982

[51] Int. Cl.⁴ ............................................. H02M 5/02
[52] U.S. Cl. ......................................... 363/9; 363/177
[58] Field of Search ..................................... 363/9–12, 363/157, 159, 160, 161, 163, 166, 169, 177; 318/768, 800, 807

[56] References Cited

FOREIGN PATENT DOCUMENTS

| 2515857 | 2/1976 | Fed. Rep. of Germany | 363/160 |
| 25925 | 7/1972 | Japan | 363/160 |
| 1077987 | 8/1967 | United Kingdom | 363/160 |

Primary Examiner—William H. Beha, Jr.
Attorney, Agent, or Firm—Andrus, Sceales, Starke & Sawall

[57] ABSTRACT

A single to multiphase AC frequency conversion technique is provided using H-switches. A plurality of H-switches are toggled in a composite coordinated but irregular timing pattern under control of logic means to yield a plurality of chopped sinusoid switched output waveforms each of a given frequency phase shifted from one another.

12 Claims, 4 Drawing Figures

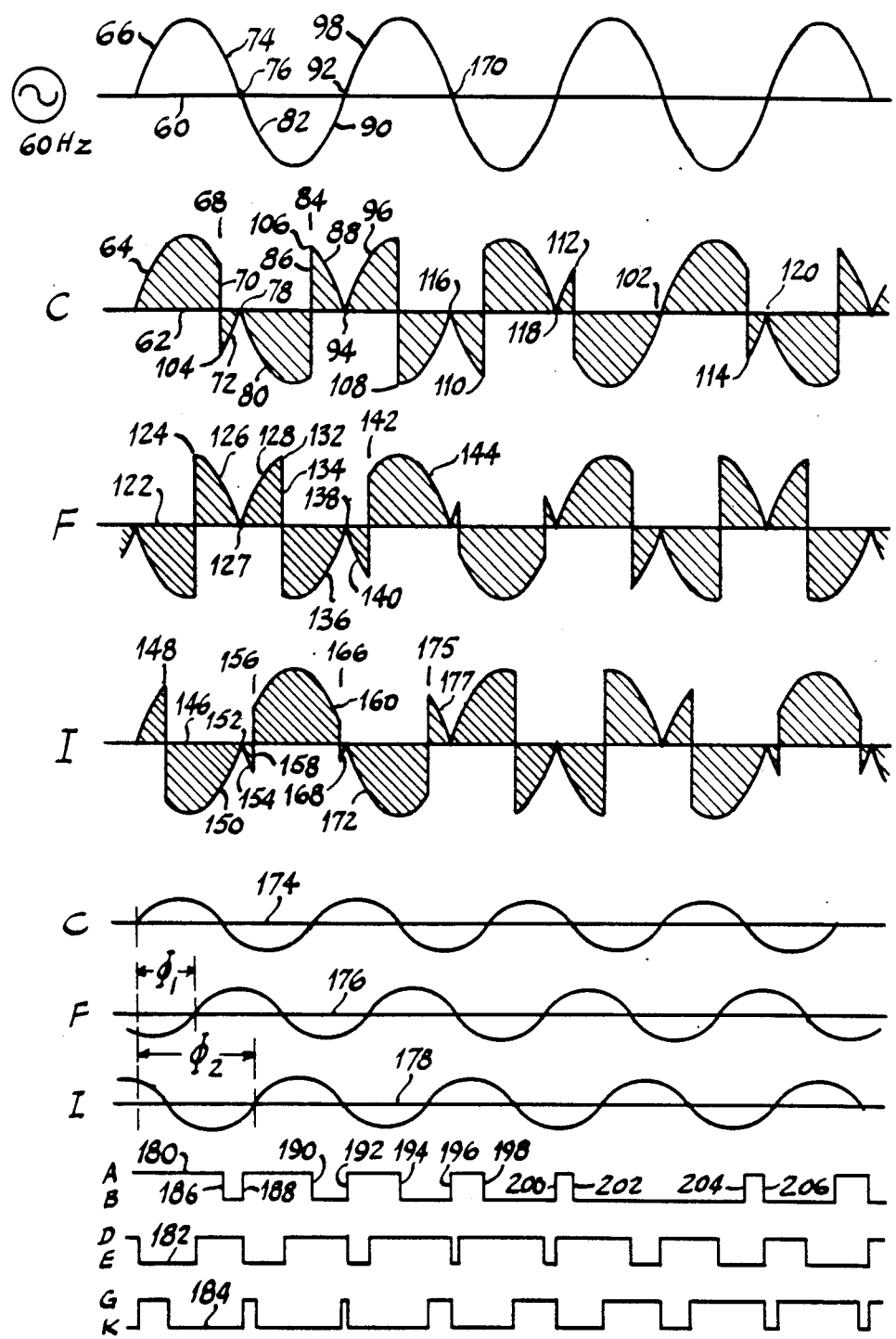

SINGLE PHASE TO POLYPHASE BRIDGE-TYPE FREQUENCY MULTIPLIER

BACKGROUND AND SUMMARY

Various AC frequency conversion techniques are known in the art, as well as various single to multiphase conversion techniques. A cycloconverter is a known device for AC frequency conversion. In one type of cycloconverter, an H-switch connects a load to a pair of AC power lines L1 and L2. The H-switch has one ON state connecting L1 to the left end of the load and connecting L2 to the right end of the load. The H-switch has another ON state connecting L2 to the left end of the load and connecting L1 to the right end of the load. The H-switch is toggled or switched between its one and other ON states at a given periodic frequency which mixes with the input frequency of the AC signal in heterodyne manner to output a plurality of frequencies, analogously to sideband generation.

The present invention provides in combination a system having a plurality of coordinated but irregular sets of switching times and logic means for a plurality of H-switches for performing in coordination the functions of phase and frequency conversion.

BRIEF DESCRIPTION OF THE DRAWINGS

FIG. 2 is a timing diagram illustrating operation of the circuit of FIG. 1 in accordance with the invention.

DETAILED DESCRIPTION

Figure 1:
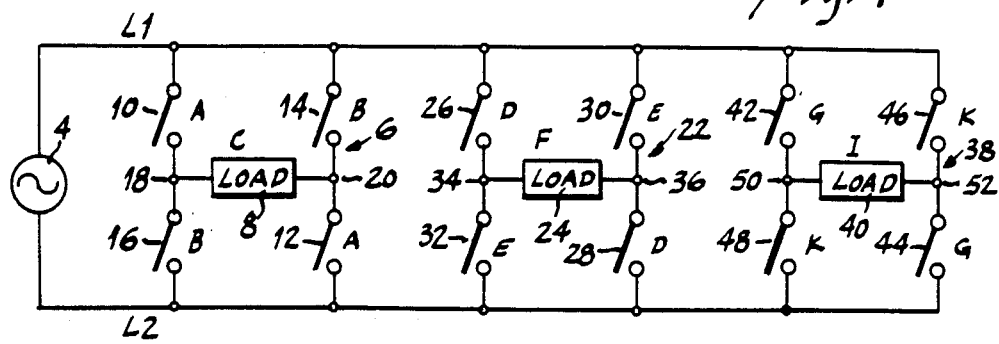
FIG. 1 is a schematic circuit diagram for illustrating the single to multiphase H-switch frequency conversion technique in accordance with the invention.

In FIG. 1, circuit 2 has a pair of power lines L1 and L2 supplied with a single phase AC signal from AC source 4. H-switch 6 connects load 8 to L1 and L2. This configuration is known, and is typically used in cycloconverters. H-switch 6 has one ON state A in which switches 10 and 12 are closed and switches 14 and 16 are open such that L1 is connected to the left end 18 of the load and L2 is connected to the right end 20 of the load. H-switch 6 has another ON state B in which switches 10 and 12 are open and switches 16 and 14 are closed such that L2 is connected to the left end 18 of the load and L1 is connected to the right end 20 of the load.

A second H-switch 22 connects a second load 24 between L1 and L2. H-switch 22 has one ON state D in which switches 26 and 28 are closed and switches 30 and 32 are open such that L1 is connected to the left end 34 of the second load 24 and L2 is connected to the right end 36 of load 24. H-switch 22 has another ON state E in which switches 26 and 28 are open and switches 32 and 30 are closed such that L2 is connected to the left end 34 of the load and L1 is connected to the right end 36 of the load.

A third H-switch 38 connects a third load 40 to L1 and L2. Third H-switch 38 has a first ON state G in which switches 42 and 44 are closed and switches 48 and 46 are open such that L1 is connected to the left end 50 of load 40 and L2 is connected to the right end 52 of the load. H-switch 38 has another ON state K in which switches 42 and 44 are open and switches 48 and 46 are closed such that L2 is connected to the left end 50 of load 40 and L1 is connected to the right end 52 of load 40.

FIG. 2 shows on timing line 60 the AC waveform from source 4. Timing line 62 shows the switched output waveform C through the first load 8. The first H-switch 6 switches to its one On state A to provide the switched output waveform segment 64 tracking waveform segment 66 of the input AC signal. At a given clock signal at 68, H switch 6 is toggled to its other ON state B as shown at transition 70, resulting in output waveform segment 72 which tracks segment 74 of the first half cycle of the input AC signal but in reverse direction through load 8. At zero crossing 76, H-switch 6 again toggles to its one ON state A as shown at transition 78, resulting in output waveform segment 80 which tracks like-going segment 82 of the input AC signal. At clock signal 84, H-switch 6 is again toggled to switch to its other ON state B as shown at transition 86, resulting in output waveform segment 88 which tracks segment 90 of the input AC signal. At zero crossing 92, the H-switch is again toggled and thus transitions at 94 to its one ON state A, resulting in output waveform segment 96, tracking segment 98 of the incoming AC signal.

The switched output waveform C on timing line 62 is a chopped sinusoid of given frequency. In the example in FIG. 2, a 60 hertz input AC signal is provided from source 4, and a 72 hertz output signal is generated. H-switch 6 is switched or toggled between its ON states A and B in response to a 144 hertz clock signal, and is also toggled between ON states A and B in response to each zero crossing of the AC signal except when the zero crossing and a clock signal coincide in time, for example as shown at 102. In this example then, the given frequency of clock signals 68, 84, and so on, is 144 hertz.

Chopped sinusoid output waveform C on timing line 62 has an inflection point at each switched or toggled transition of H-switch 6 between ON states A and B. Inflection points 104, 106, 108, 110, 112 and 114 are due to the given frequency clock signal e.g. the 144 hertz clock. Inflection points 78, 94, 116, 118 and 120 are due to the zero crossing of the AC signal. At 102, a zero crossing and a 144 hertz clock signal coincide, and the toggling of H-switch 6 is prevented so that there is no switched transition of the output waveform, i.e. H-switch 6 remains in its other ON state B at time 102.

FIG. 2 shows on timing line 122 the second switched output waveform F through the second load 24. Second H-switch 22 switches to its one ON state D at clock signal 124 to provide output waveform segment 126 tracking correspondent like-going segment of the input AC signal on timing line 60. At zero crossing 76 of the AC input signal, H-switch 22 toggles to its other ON state E as shown at transition 127, resulting in output waveform segment 128 tracking in opposite-going manner the correspondent waveform segment of the input AC signal generally shown at 82. At clock signal 132, H-switch 6 is toggled to switch to its one ON state D as shown at transition 134, resulting in output waveform segment 136 tracking in like-going manner the correspondent waveform segment of the input AC signal generally shown at 90 on timing line 60. At zero crossing 92, H switch 22 again toggles and switches to its other ON state E as shown at transition 138, resulting in output waveform segment 140 tracking the correspondent segment of the input AC signal at 98. At clock signal 142, H-switch 22 is again toggled to its one ON state D, resulting in output waveform segment 144 tracking in opposite-going manner a correspondent waveform segment of the incoming AC signal on timing line 60. In the example in FIG. 2, the given clock frequency is 144 hertz, and the clock signals are delayed by a given increment from the clock signals in timing line 62.

Timing line 146 shows the third switched output waveform I through the third load 40. Third H-switch 38 switches to ON state K at clock signal 148, resulting in output waveform segment 150 tracking in opposite-going manner the correspondent waveform segment of the input AC signal on timing line 60. At zero crossing 76, H-switch 38 is toggled to switch to its ON state G as shown at transition 152, resulting in output waveform segment 154 which tracks in like-going manner the correspondent waveform segment of the input AC signal on timing line 60. At clock signal 156, H-switch 38 is again toggled to switch to ON state K as shown at transition 158, resulting in output waveform segment 160 which tracks in opposite-going manner the correspondent waveform segment of the input AC signal. At clock signal 166, H-switch 38 toggles to ON state G, resulting in output waveform segment 168 which tracks in like-going manner the correspondent waveform segment of the input AC signal. At zero crossing 92, H-switch 38 toggles to ON state K, resulting in output waveform segment 172. At clock signal 175, H-switch 38 toggles to ON state G, resulting in output waveform segment 177, and so on. In the example in FIG. 2, the given frequency of the clock on timing line 146 is 144 hertz, and the clock signals are further delayed from the clock signals on line 62 by a greater increment than the delay of the clock signals on line 122.

Timing line 174 shows the fundamental frequency component of the chopped sinusoid waveform on timing line 62. Timing line 176 shows the fundamental frequency component of waveform F on line 122. Timing line 178 shows the fundamental frequency component of the waveform I on line 146. Each of the three waveforms C, F and I is phase shifted from one another. The phase difference between C and F is $\phi_1$, and the phase difference between C and I is $\phi_2$.

Timing lines 180, 182 and 184 show the irregular timing patterns for toggling respective H-switches 6, 22 and 38 between their respective one and other ON states A and B, D and E, and G and K. Each inflection point in each of the chopped sinusoid output waveforms C, F and I on timing lines 62, 122 and 146 correspond to a transition in the respective timing line 180, 182 and 184. For example, inflection points in timing line 62 at 104, 78, 106, 94, 108, 116, 110, 118, 112, 114 and 120 correspond to toggled transitions 186, 188, 190, 192, 194, 196, 198, 200, 202, 204 and 206, respectively of H-switch 6 between ON states A and B.

Each of the chopped sinusoid output waveforms on timing lines 62, 122 and 146 has a positive half cycle during which the respective H-switch is toggled to one ON state when L1 is positive and toggled to its other ON state when L2 is positive. Each chopped sinusoid output waveform has a negative half cycle during which its respective H-switch is switched to its one ON state when L1 is negative and switched to its other ON state when L2 is negative. The chopped sinusoid switched output waveforms are not as efficient as the input 60 hertz waveform. This is because of the chopping and reversal of the various waveform segments preventing build-up of voltage. For example, in waveform C on timing line 62, in the negative half cycle provided by waveform segments 72 and 80, the voltage rises negatively and then falls back to zero at 78 and then rises negatively again. This is not as efficient as a half cycle of a non-chopped sinusoid, but may be tolerated in certain applications.

One exemplary application is where an increase in frequency is desired for only short periods of time compared with normal lower frequency run-time. An example is refrigeration control where the compressor must be designed for the worst case situation even though such worst case situation occurs perhaps only 1% of the time, for example when a freezer must cool down a whole new supply of food. During the other 99% of the time, the compressor must only maintain an already cool condition, and thus may only need perhaps half its capacity. One solution to this over-capacity is to use a smaller compressor and run it at normal speed for normal duty, and run it at a higher speed during the small percentage of time needed for higher capacity cooling, i.e. during the 1% cool-down time. This faster speed operation is not detrimental to the compressor for short periods of time. In FIG. 2, a trade-off in the frequency conversion technique is that each of the resultant chopped sinusoid switched output waveforms of increased frequency is less efficient than the input AC frequency. This less efficient use of electrical power is far outweighed by the reduction in compressor capacity enabled thereby. Furthermore, during the 99% normal run-time, a smaller compressor is driven by a smaller motor at its most efficient load rating.

Figure 3:
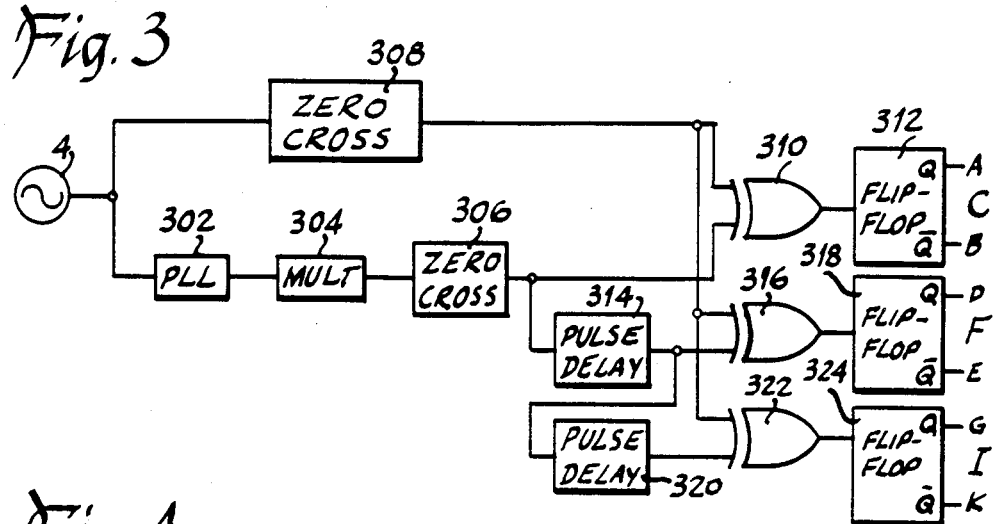
FIG. 3 is a schematic circuit diagram illustrating a timing control for providing the timing in FIG. 2.

The cumulative irregular switching pattern shown in timing lines 180, 182 and 184 is provided in one implementation by exclusively ORing the zero crossings of the AC signal with the clock signal and with respectively delayed clock signals to toggle respective H-switches between their ON states. FIG. 3 shows one form of the preferred implementation, wherein the given frequency clock signal is provided by a phase-lock loop 302 extracting the frequency of the AC signal from source 4, which frequency is multiplied by a clock multiplier 304 or the like, such as a frequency synthesizer, and delivered to a zero crossing detector 306, whose output provides the clock signal. For the timing in FIG. 2, the multiplication factor in multiplier 304 is 6/5. A zero crossing detector 308 is also provided to detect zero crossings of the AC signal from source 4. The clock signals from 306 and the zero crossing signals from 308 are input to an exclusive OR gate 310 whose output toggles a flip-flop 312 between its Q and $\overline{Q}$ outputs to switch H-switch 6 between A and B.

The clock signal from 306 is also delivered to a clock delay 314. The zero crossing signals from 308 and the delayed clock signals from 314 are input to a second exclusive OR gate 316 whose output toggles a second flip-flop 318 to switch second H-switch 22 between D and E. The output of clock delay 314 is delivered to another clock delay 320. The zero crossing signals from 308 and the further delayed clock signals from 320 are input to a third exclusive OR gate 322 whose output toggles a third flip-flop 324 to switch third H-switch 38 between G and K.

Figure 4:
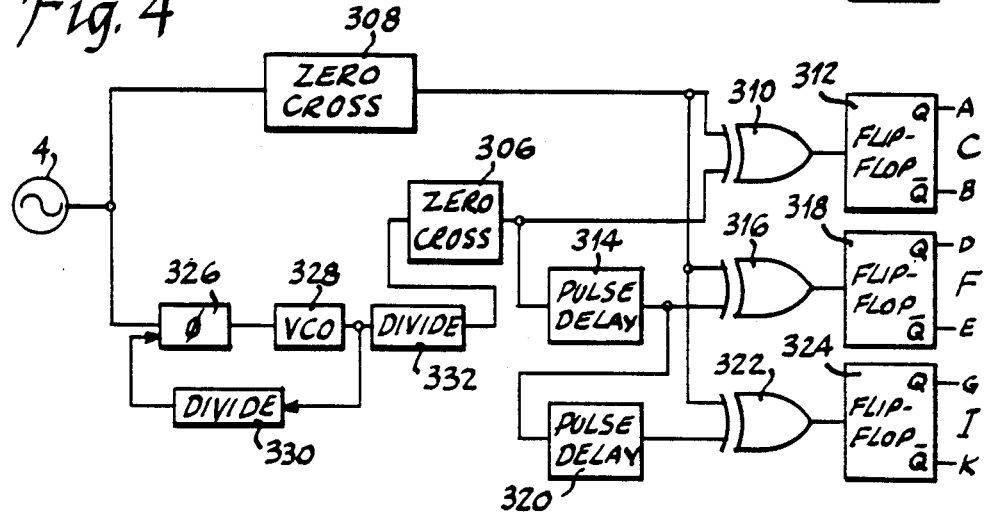
FIG. 4 is a schematic circuit diagram of an alternate timing control for providing the timing in FIG. 2.

FIG. 4 shows another timing control and uses like reference characters as in FIG. 3 where appropriate to facilitate clarity. Phase detector 326 and voltage controlled oscillator 328 of the phase-lock loop have a feedback divider 330, such as a counter, connected from the output of VCO 328 to the input of phase detector 326. As is known, if divider 330 performs a divide by six operation, then the output of VCO 328 will have a frequency six times as great as the input from source 4. The output of VCO 328 is delivered to a divider 332 which in the above example performs a divide by five operation, such that the output of divider 332 has a frequency 6/5 as great as the input from source 4. This multiple of the input AC signal is delivered to zero crossing detector 306, whose output is the clock signal.

It is recognized that various modifications are possible within the scope of the appended claims.

We claim:

1. In an AC circuit having multiphase load means connected respectively by a plurality of H-switches to a pair of power lines L1 and L2 supplied with an AC signal from an AC source, each H-switch having one ON state connecting L1 to the left end of its respective said load and connecting L2 to the right end of its respective said load, each H-switch having another ON state connecting L2 to the left end of its respective said load and connecting L1 to the right end of its respective said load, a single to multiphase frequency conversion technique comprising alternately toggling the first of said H-switches between said one and said other ON state at irregular times at any point in the AC cycle to yield a first chopped sinusoid switched output waveform of any given up-converted output frequency, and alternately toggling each remaining H-switch between said one and said other ON states at respectively delayed but irregular times to yield one or more additional switched output waveforms of said given frequency each phase shifted from said first output waveform.

2. In an AC circuit having multiphase load means connected respectively by a plurality of H-switches to a pair of power lines L1 and L2 supplied with an AC signal from an AC source, each H-switch having one ON state connecting L1 to the left end of its respective said load and connecting L2 to the right end of its respective said load, each H-switch having another ON state connecting L2 to the left end of its respective said load and connecting L1 to the right end of its respective said load, a single to multiphase frequency conversion technique comprising alternately toggling the first of said H-switches between said one and said other ON state at irregular times to yield a first switched output waveform of a given frequency, and alternately toggling each remaining H-switch between said one and said other ON states at respectively delayed but irregular times to yield one or more additional switched output waveforms of said given frequency each phase shifted from said first output waveform, and comprising:

toggling said first H-switch in response to a given frequency clock signal and also toggling said first H-switch in response to each zero crossing of said AC signal except when said zero crossing and said lock signal coincide in time; and toggling a second said H-switch in response to a delayed said clock signal and also toggling said second H-switch in response to each said zero crossing of said AC signal except when said zero crossing and said delayed clock signal coincide in time.

3. The invention according to claim 2 comprising toggling a third said H-switch in response to a further delayed said clock signal and also toggling said third H-switch in response to each said zero crossing of said AC signal except when said zero crossing and said further delayed clock signal coincide in time, to yield three said switched output waveforms each of said given frequency and each phase shifted from one another, whereby to afford a three phase output.

4. The invention according to claim 3 wherein each of the three said switched output waveforms comprises a chopped sinusoid, and wherein each said chopped sinusoid has an inflection point at each toggled transition of its respective said H-switch.

5. The invention according to claim 4 comprising:

providing a first said chopped sinusoid output waveform from said first H-switch by exclusively ORing said clock signal and said zero crossings of said AC signal to toggle said first H-switch between said one and other ON states;

providing a second said chopped sinusoid output waveform from said second H-switch by exclusively ORing said delayed clock signal and said zero crossings of said AC signal to toggle said second H-switch between said one and other ON states; and providing a third said chopped sinusoid output waveform from said third H-switch by exclusively ORing said further delayed clock signal and said zero crossings of said AC signal to toggle said third H-switch between said one and other ON state.

6. In an AC circuit having multiphase load means connected respectively by a plurality of H-switches to a pair of power lines L1 and L2 supplied with an AC signal from an AC source, each H-switch having one ON state connecting L1 to the left end of its respective said load and connecting L2 to the right end of its respective said load, each H-switch having another ON state connecting L2 to the left end of its respective said load and connecting L1 to the right end of its respective said load, a single to multiphase frequency conversion technique comprising alternately toggling the first of said H-switches between said one and said other ON state at irregular times to yield a first switched output waveform of a given frequency, and alternately toggling each remaining H-switch between said one and said other ON states at respectively delayed but irregular times to yield one or more additional switched output waveforms of said given frequency each phase shifted from said first output wavefrom, wherein each said switched output waveform comprises a chopped sinusoid, and comprising:

toggling said first H-switch betwen said one and other ON states at a given multiple of the frequency of zero crossings of said AC signal, and also toggling said first H-switch in response to each zero crossing of said AC signal except when said zero crossing and said multiple coincide in time, to yield a first chopped sinusoid switched output waveform;

toggling a second said H-switch between said one and other ON states at a delayed said given multiple of the frequency of zero crossings of said AC signal, and also toggling said second H-switch in response to each zero crossing of said AC signal except when said zero crossing and said delayed mutiple coincide in time, to yield a second chopped sinusoid switched output waveform; and toggling a third H-switch between said one and other ON states at a further delayed said given multiple of the frequency of zero crossings said AC signal, and also toggling said third H-switch in response to each zero crossing of said AC signal except when said zero crossing and said further delayed multiple coincide in time, to yield a third chopped sinusoid switched output waveform, each of said three chopped sinusoid switched output waveforms being out of phase with one another.

7. The invention according to claim 6 wherein:

said first output waveform has a positive half cycle during which said first H-switch is switched to said one ON state when L1 is positive and switched to said other ON state when L2 is positive, and said first output waveform has a negative half cycle during which said first H-switch is switched to said one ON state when L1 is negative and switched to said other ON state when L2 is negative;

said second output waveform has a positive half cycle during which said second H-switch is switched to said one ON state when L1 is positive and switched to said other ON state when L2 is positive, and said second output waveform has a negative half cycle during which said second H-switch is switched to said one ON state when L1 is negative and switched to said other ON state when L2 is negative; and said third output waveform has a positive half cycle during which said third H-switch is switched to said one ON state when L1 is positive and switched to said other ON state when L2 is positive, and said third output waveform has a negative half cycle during which said third H switch is switched to said one ON state when L1 is negative and switched to said other ON state when L2 is negative.

8. The invention according to claim 7 wherein:

said first H-switch is toggled between said one and other ON states by exclusively ORing said multiple and said zero crossings of said AC signal to provide a first chopped sinusoid output waveform having an inflection point at each switched transition of said first H-switch between said one and other ON states;

said second H-switch is toggled between said one and other ON states by exclusively ORing said delayed multiple and said zero crossings of said AC signal to provide a second chopped sinusoid output waveform having an inflection point at each switched transition of said second H-switch between said one and other ON states; and said third H-switch is toggled between said one and other ON states by exclusively ORing said further delayed multiple and said zero crossings of said AC signal to provide a third chopped sinusoid output waveform having an inflection point at each switched transition of said third H-switch between said one and other ON states.

9. Single to multiphase frequency conversion apparatus for an AC signal comprising:

a pair of power lines L1 and L2 supplied with an AC signal from an AC source;

a plurality of H-switches each connecting a load to L1 and L2, each H-switch having one ON state connecting L1 to the left end of its respective said load and connecting L2 to the right end of its respective said load, each H-switch having another ON state connecting L2 to the left end of its respective said load and connecting L1 to the right end of its respective said load;

timing means for controlling the toggling of said H-switches between said one and other ON states at a plurality of sets of coordinated but irregular times at any point in the AC cycle to yield a plurality of chopped sinusoid switched output waveforms each of any given up-converted output frequency phase shifted from one another.

10. The invention according to claim 9 wherein said timing means includes means for alternately toggling the first of said H-switches between said one and other ON states at irregular times to yield a first switched output waveform of said given frequency, and alternately toggling each remaining H-switch between said one and other ON states at respectively delayed irregular times to yield one or more additional switched output waveforms of said given frequency each phase shifted from said first output waveform.

11. Single to multiphase frequency conversion apparatus for an AC signal comprising:

a pair of power lines L1 and L2 supplied with an AC signal from an AC source;

a plurality of H-switches each connecting a load to L1 and L2, each H-switch having one ON state connecting L1 to the left end of its respective said load and connecting L2 to the right end of its respective said load, each H-switch having another ON state connecting L2 to the left end of its respective said load and connecting L1 to the right end of its respective said load;

timing means for controlling the toggling of said H-switches between said one and other ON states at a plurality of sets of coordinated but irregular times to yield a plurality of switched output waveforms each of a given frequency phase shifted from one another, wherein said timing means includes means for alternately toggling the first of said H-switches between said one and other ON states at irregular times to yield a first switched output waveform of said given frequency, and alternately toggling each remaining H-switch between said one and other ON states at respectively delayed irregular times to yield one or more additional switched output waveforms of said given frequency each phase shifted from said first output waveform and wherein said timing means comprises:

clock means generating a given frequency clock signal;

zero crossing detector means for generating a zero crossed signal in response to each zero crossing of said AC signal;

first logic gating means generating a toggling signal to toggle said first H-switch in response to each said clock signal and in response to each said zero crossing signal except when said clock signal and said zero crossing signal coincide in time;

one or more clock delay means for delaying said clock signal;

one or more additional logic gating means each generating a toggling signal to toggle its respective said H-switch in response to its respective said delayed clock signal and in response to each said zero crossing signal except when said respective delayed clock signal and said zero crossing signal coincide in time.

12. The invention according to claim 11 comprising:

first clock delay means for providing a delayed said clock signal second clock delay means for providing a further delayed said clock signal;

second logic gating means generating a toggling signal to toggle a second said H-switch in response to each said delayed clock signal and in response to each said zero crossing signal except when said delayed clock signal and said zero crossing signal coincide in time;

third logic gating means generating a toggling signal to toggle a third said H-switch in response to each said further delayed clock signal and in response to each said zero crossing signal except when said further delayed clock signal and said zero crossing signal coincide in time.

* * * * *